United States Patent
Lee

(10) Patent No.: US 10,216,239 B2
(45) Date of Patent: Feb. 26, 2019

(54) REFERENCE VOLTAGE GENERATION CIRCUIT, RECEIVER, SEMICONDUCTOR APPARATUS AND SYSTEM USING THE SAME

(71) Applicant: SK hynix Inc., Icheon-si, Gyeonggi-do (KR)

(72) Inventor: Kwang Hun Lee, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 361 days.

(21) Appl. No.: 15/046,732

(22) Filed: Feb. 18, 2016

(65) Prior Publication Data

US 2017/0115647 A1   Apr. 27, 2017

(30) Foreign Application Priority Data

Oct. 22, 2015 (KR) .................. 10-2015-0147416

(51) Int. Cl.
*G11C 7/00* (2006.01)
*G06F 1/26* (2006.01)

(52) U.S. Cl.
CPC ..................................... *G06F 1/26* (2013.01)

(58) Field of Classification Search
CPC ....................................................... G06F 1/26
USPC ............. 700/298, 297; 327/541; 365/189.09
See application file for complete search history.

(56) References Cited

U.S. PATENT DOCUMENTS

| | | | | |
|---|---|---|---|---|
| 6,662,084 B2 * | 12/2003 | Hiraki | ...... | G06F 1/26 323/268 |
| 8,493,131 B2 | 7/2013 | Mo et al. | | |
| 2006/0157737 A1 * | 7/2006 | Lim | ...... | H01L 27/0207 257/203 |
| 2007/0024351 A1 * | 2/2007 | Kang | ...... | G05F 1/465 327/541 |
| 2008/0252332 A1 * | 10/2008 | Lee | ...... | H03K 19/0002 326/30 |
| 2014/0126665 A1 * | 5/2014 | Lee | ...... | H04B 1/1607 375/295 |

FOREIGN PATENT DOCUMENTS

KR   1020090112418 A   10/2009

* cited by examiner

*Primary Examiner* — Connie Yoha
(74) *Attorney, Agent, or Firm* — William Park & Associates Ltd.

(57) ABSTRACT

A reference voltage generation circuit may be provided. The reference voltage generation circuit may be configured to generate a reference voltage according to a voltage set code. The reference voltage generation circuit may include a voltage level stabilizer. The reference voltage generation circuit may be configured to deactivate the voltage level stabilizer when a level of the reference voltage changes based on the voltage set code.

20 Claims, 6 Drawing Sheets

REFERENCE VOLTAGE GENERATION CIRCUIT, RECEIVER, SEMICONDUCTOR APPARATUS AND SYSTEM USING THE SAME

CROSS-REFERENCES TO RELATED APPLICATION

The present application claims priority under 35 U.S.C. § 119(a) to Korean application number 10-2015-0147416, filed on Oct. 22, 2015, in the Korean Intellectual Property Office, which is incorporated herein by reference in its entirety as set forth in full.

BACKGROUND

1. Technical Field

Various embodiments generally relate to a semiconductor apparatus, and more particularly, to a reference voltage generation circuit, and a receiver, a semiconductor apparatus and a system using the same.

2. Related Art

An electronic system includes a plurality of semiconductor apparatuses. Each of the plurality of semiconductor apparatuses performs data communication through a signal transmission line. The signal transmission line may be a transmission bus. Through the signal transmission line, a differential signal or a single-ended signal may be transferred. When the differential signal is transferred through the signal transmission line, the semiconductor apparatus receives the differential signal by amplifying the differential signal. On the other hand, when the single-ended signal is transferred through the signal transmission line, the semiconductor apparatus receives the single-ended signal by amplifying the single-ended signal and a reference voltage. The reference voltage may have a voltage level corresponding to half of the swing range of the single-ended signal transferred through the signal transmission line.

SUMMARY

Various embodiments may provide a reference voltage generation circuit capable of rapidly increasing a level of a reference voltage to a target level, and a receiver, a semiconductor apparatus and a system using the same.

In an embodiment, a reference voltage generation circuit may be provided. The reference voltage generation circuit may include an internal reference voltage generator configured to change a level of a reference voltage according to a voltage set code. The reference voltage generation circuit may include a voltage level stabilizer configured to stabilize the reference voltage in response to an enablement signal. The reference voltage generation circuit may include a level stabilization controller configured to generate the enablement signal based on the voltage set code.

In an embodiment, a receiver may be provided. The receiver may include a reception circuit configured to generate an internal signal by differentially amplifying a reference voltage and a signal transmitted through a signal transmission line. The receiver may include a reference voltage generation circuit. The reference voltage generation circuit may include a voltage level stabilizer configured to adjust the reference voltage according to a voltage set code, and to stabilize a level of the reference voltage, and configured to generate the reference voltage according to the voltage set code, and deactivate the voltage level stabilizer when the level of the reference voltage changes and to activate the voltage level stabilizer when the reference voltage reaches a target level, based on the voltage set code.

In an embodiment, a receiver may be provided. The receiver may include a reception circuit configured to generate an internal signal by differentially amplifying a reference voltage and a signal transmitted through a signal transmission line. The receiver may include a reference voltage generation circuit configured to generate the reference voltage, and stabilize a level of the reference voltage after the reference voltage reaches a target level, based on a voltage set code.

DETAILED DESCRIPTION

Hereinafter, semiconductor apparatuses will be described below with reference to the accompanying drawings through examples of embodiments.

Figure 1:
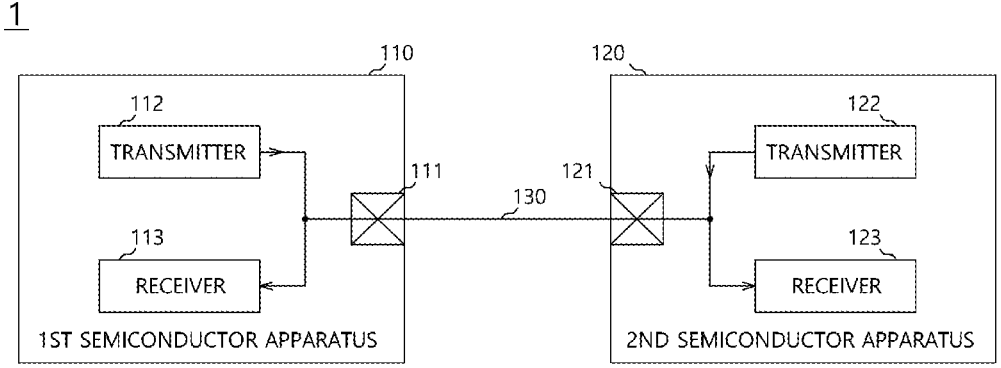
FIG. 1 is a block diagram illustrating a representation of an example of a system in accordance with an embodiment.

Referring to FIG. 1, a system 1 in accordance with an embodiment of the present disclosure may include a first semiconductor apparatus 110 and a second semiconductor apparatus 120. The first semiconductor apparatus 110 and the second semiconductor apparatus 120 may be electronic elements communicating with each other. In an embodiment, the first semiconductor apparatus 110 may be a master apparatus and the second semiconductor apparatus 120 may be a slave apparatus performing various operations under the control of the first semiconductor apparatus 110. For example, the first semiconductor apparatus 110 may be a host apparatus such as a processor, and the processor may be one or more of the central processing unit (CPU), the graphic processing unit (GPU), the multi-media processor (MMP), the digital signal processor. The processor may be implemented in a form of the system on chip (SoC) by combining processor chips having various functions such as the application processor (AP). The second semiconductor apparatus 120 may be a memory. The memory may include the volatile memory device and the non-volatile memory. The volatile memory may include the static RAM (SRAM), the dynamic RAM (DARM), and the synchronous DRAM (SDRAM). The non-volatile memory may include the read only memory (ROM), the programmable ROM (PROM), the electrically erase and programmable ROM (EEPROM), the electrically programmable ROM (EPROM), the flash memory, the phase change RAM (PRAM), the magnetic RAM (MRAM), the resistive RAM (RRAM), and the ferroelectric RAM (FRAM).

The first and second semiconductor apparatuses 110 and 120 may be electrically coupled to each other through a signal transmission line 130. The first semiconductor apparatus 110 may include a pad 111, and the pad 111 may be electrically coupled to the signal transmission line 130. The second semiconductor apparatus 120 may include a pad 121, and the pad 121 may be electrically coupled to the signal transmission line 130. The signal transmission line 130 may be one of a channel, a link, and a bus. The first semiconductor apparatus 110 may include a transmitter 112 and a receiver 113. The transmitter 112 may generate an output signal according to an internal signal of the first semiconductor apparatus 110, and may transmit the output signal to the second semiconductor apparatus 120 through the signal transmission line 130. The receiver 113 may generate an internal signal by receiving a signal transmitted from the second semiconductor apparatus 120 through the signal transmission line 130. In the similar manner, the second semiconductor apparatus 120 may include a transmitter 122 and a receiver 123. The transmitter 122 may generate an output signal according to an internal signal of the second semiconductor apparatus 120, and may transmit the output signal to the first semiconductor apparatus 110 through the signal transmission line 130. The receiver 123 may generate an internal signal by receiving a signal transmitted from the first semiconductor apparatus 110 through the signal transmission line 130.

Figure 2:
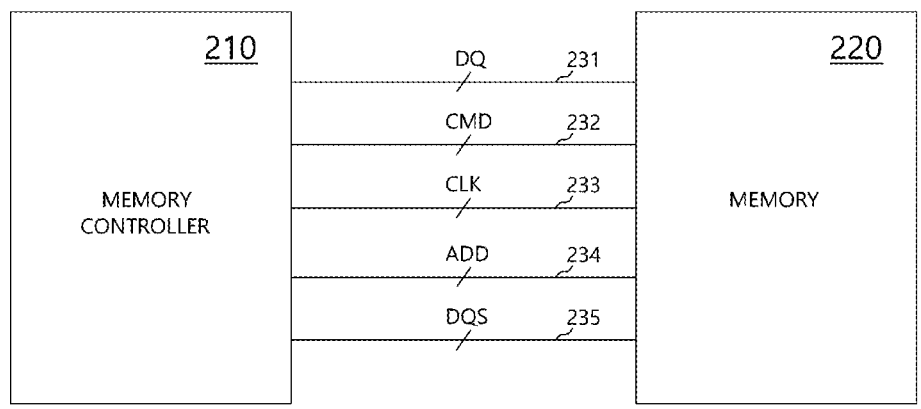
FIG. 2 is a block diagram illustrating a representation of an example of a memory system in accordance with an embodiment.

FIG. 2 is a block diagram illustrating a representation of an example of a memory system 2 in accordance with an embodiment of the present disclosure. Referring to FIG. 2, the memory system 2 may include a memory controller 210 and a memory 220. The memory controller 210 may control the memory 220 to perform various operations. The memory controller 210 may be the first semiconductor apparatus 110, and the memory 220 may be the second semiconductor apparatus 120. The memory controller 210 and the memory 220 may be electrically coupled to each other through a plurality of buses, and may perform data communication with each other. For example, the plurality of buses may include a data bus 231, a command bus 232, a clock bus 233, an address bus 234 and a data strobe bus 235, each of which may include a plurality of signal transmission lines.

The memory controller 210 may transmit various control signals to the memory 220. For example, the memory controller 210 may provide the memory 220 with data DQ, a command signal CMD, a clock signal CLK, an address signal ADD, a data strobe signal DQS through the plurality of buses. The memory 220 may provide the memory controller 210 with data DQ and a data strobe signal DQS through the data bus 231 and the data strobe bus 235. The memory 220 may perform write and read operations under the control of the memory controller 210. For the write operation of the memory 220, the memory controller 210 may provide the memory 220 with the data DQ, the command signal CMD, the clock signal CLK, the address signal ADD and the data strobe signal DQS. For the read operation of the memory 220, the memory controller 210 may provide the memory 220 with the command signal CMD, the clock signal CLK and the address signal ADD, and the memory 220 may provide memory controller 210 with the data DQ and the data strobe signal DQS.

Each of the data DQ, the command signal CMD, the clock signal CLK, the address signal ADD and the data strobe signal DQS may be a differential signal and may be provided through the plurality of buses 231 to 235. One or more of the data DQ, the command signal CMD, the clock signal CLK, the address signal ADD and the data strobe signal DQS may be single-ended signals. The memory 220 may include the receiver 123 as described with reference to FIG. 1 for receiving the signals transferred through the plurality of buses 231 to 235. That is, the memory 220 may include a receiver electrically coupled to the data bus 231 for receiving the data DQ, a receiver electrically coupled to the command bus 232 for receiving the command signal CMD, a receiver electrically coupled to the clock bus 233 for receiving the clock signal CLK, a receiver electrically coupled to the address bus 234 for receiving the address signal ADD, and a receiver electrically coupled to the data strobe bus 235 for receiving the data strobe signal DQS. Those receivers may use a reference signal for receiving the single-ended signals.

Figure 3:
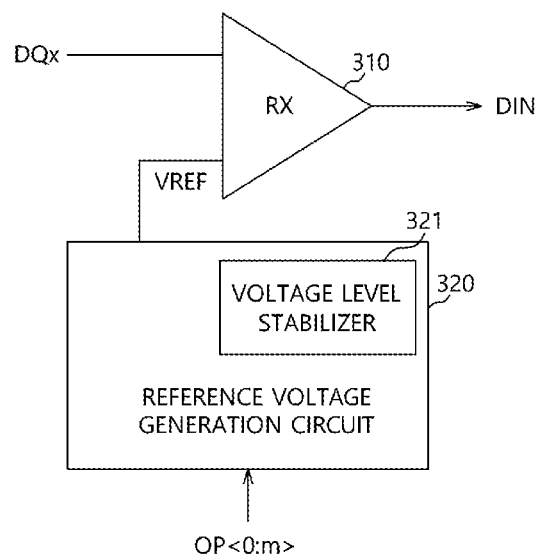
FIG. 3 is a block diagram illustrating a representation of an example of a receiver in accordance with an embodiment.

FIG. 3 is a block diagram illustrating a representation of an example of a receiver 30 in accordance with an embodiment of the present disclosure. Referring to FIG. 3, the receiver 30 may be each of the receivers 113 and 123 of the first and second semiconductor apparatuses 110 and 120 described with reference to FIG. 1. Referring to FIG. 3, the receiver 30 may include a reception circuit 310 and a reference voltage generation circuit 320. The reception circuit 310 may be electrically coupled to one of the plurality of buses 231 to 235 described with reference to FIG. 2. The reception circuit 310 may generate an internal signal by differentially amplifying a reference voltage VREF and a signal transmitted through the plurality of buses 231 to 235. Referring to FIG. 3, the reception circuit 310 may be electrically coupled to one of signal transmission lines forming, for example, the data bus 231. The reception circuit 310 may receive, for example, data DQx, which is the single-ended signal. The reception circuit 310 may generate an internal signal DIN by differentially amplifying the reference voltage VREF and, for example, the data DQx.

The reference voltage generation circuit 320 may generate the reference voltage VREF according to a voltage set code OP<0:m>. The reference voltage generation circuit 320 may be a voltage generator and may generate the reference voltage VREF having a level corresponding to the voltage set code OP<0:m>. For example, a target level of the reference voltage VREF may be a half of the swing range of the data DQx transferred through the signal transmission line. The reference voltage generation circuit 320 may change the level of the reference voltage VREF according to a voltage set code OP<0:m>. The voltage set code OP<0:m> may be transferred from the memory controller 210 described with reference to FIG. 2. The voltage set code OP<0:m> may be stored in a storage region of the memory 220 such as the mode register set. The voltage set code OP<0:m> may be provided to the reference voltage generation circuit 320 when the memory 220 makes transit from the stand-by mode (e.g., the sleep mode, the power-down mode and the deep power-down mode) to the active mode. A value of the voltage set code OP<0:m> may continuously change through the training operation between the memory controller 210 and the memory 220.

The reference voltage generation circuit 320 may include a voltage level stabilizer 321 configured to adjust the reference voltage VREF and stabilize the level of the reference voltage VREF. The reference voltage generation circuit 320 may control activation of the voltage level stabilizer 321 based on the voltage set code OP<0:m>. The reference voltage generation circuit 320 may deactivate the voltage level stabilizer 321 when changing the level of the reference voltage VREF according to the voltage set code OP<0:m>, and may activate the voltage level stabilizer 321 when the reference voltage VREF reaches the target level.

Figure 4:
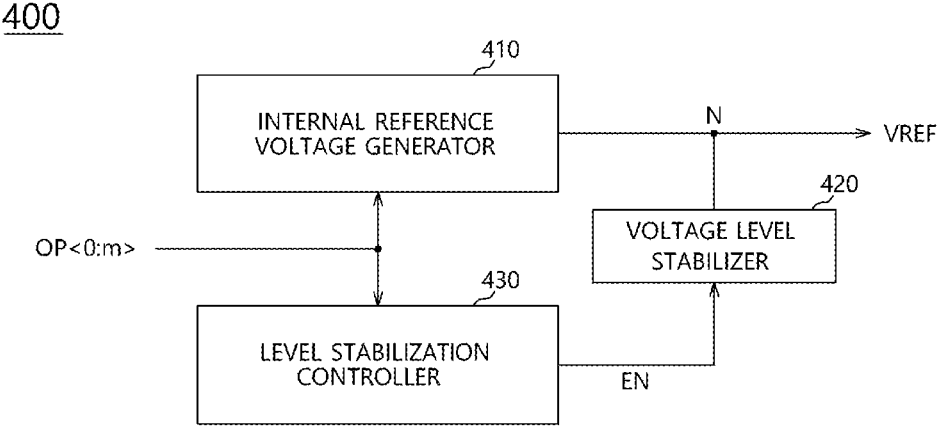
FIG. 4 is a block diagram illustrating a representation of an example of a reference voltage generation circuit in accordance with an embodiment.

FIG. 4 is a block diagram illustrating a representation of an example of a reference voltage generation circuit 400 in accordance with an embodiment of the present disclosure. Referring to FIG. 4, the reference voltage generation circuit 400 may include an internal reference voltage generator 410, a voltage level stabilizer 420 and a level stabilization controller 430. The internal reference voltage generator 410 may generate the reference voltage VREF according to the voltage set code OP<0:m>. The internal reference voltage generator 410 may generate the reference voltage VREF according to a value of the voltage set code OP<0:m>. The internal reference voltage generator 410 may be implemented by a general voltage generator configured to change an output voltage level according to a multi-bit code signal.

The voltage level stabilizer 420 may stabilize the level of the reference voltage VREF. The voltage level stabilizer 420 may be coupled to a node N where the reference voltage VREF is outputted. The voltage level stabilizer 420 may be activated in response to an enablement signal EN. The voltage level stabilizer 420 may be deactivated when the enablement signal EN is disabled. The voltage level stabilizer 420 may be activated and stabilize the level of the reference voltage VREF when the enablement signal EN is enabled. The voltage level stabilizer 420 may stabilize the level of the reference voltage VREF by increasing loading of the node N where the reference voltage VREF is outputted. For example, the voltage level stabilizer 420 may include a plurality of capacitors and may maintain a voltage level of the node N where the reference voltage VREF is outputted. In response to the enablement signal EN, the voltage level stabilizer 420 may control capacitance of the node N where the reference voltage VREF is outputted.

The level stabilization controller 430 may generate the enablement signal EN based on the voltage set code OP<0:m>. The level stabilization controller 430 may disable the enablement signal EN when the value of the voltage set code OP<0:m> changes. The level stabilization controller 430 may enable the enablement signal EN a predetermined time after the enablement signal EN is disabled. The level stabilization controller 430 may deactivate the voltage level stabilizer 420 when the level of the reference voltage VREF changes, and may activate the voltage level stabilizer 420 when the reference voltage VREF reaches the target level. Under the control of the level stabilization controller 430, the voltage level stabilizer 420 may allow the reference voltage VREF to rapidly reach the target level according to the voltage set code OP<0:m>, and may stably maintain the level of the reference voltage VREF after the reference voltage VREF reaches the target level.

Figure 5:
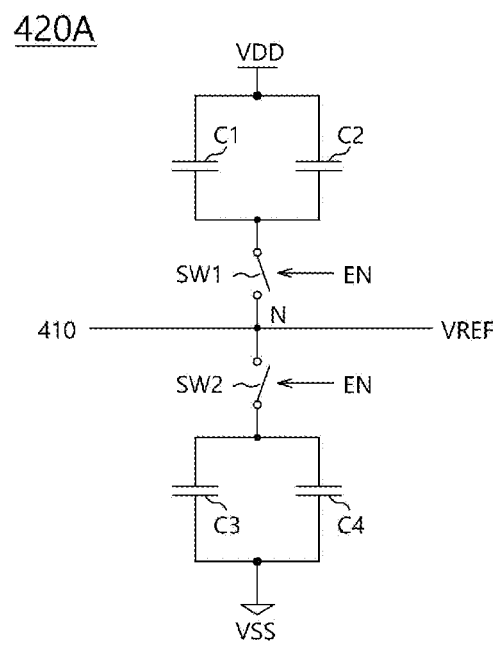
FIG. 5 is a block diagram illustrating a representation of an example of a voltage level stabilizer in accordance with an embodiment.

FIG. 5 is a block diagram illustrating a representation of an example of a voltage level stabilizer 420A in accordance with an embodiment of the present disclosure. Referring to FIG. 5, the voltage level stabilizer 420A may include first to fourth capacitors C1, C2, C3 and C4 and first and second switches SW1 and SW2. Each of the first to fourth capacitors C1, C2, C3 and C4 may be a plate capacitor or a MOS capacitor. The first capacitor C1 may be electrically coupled to a power supply voltage VDD at one end, and to the first switch SW1 at the other end. The second capacitor C2 may be electrically coupled to the power supply voltage VDD at one end, and to the second switch SW1 at the other end. The first switch SW1 may be electrically coupled to both of the first and second capacitors C1 and C2 at one end, and to the node N, where the reference voltage VREF is outputted, at the other end. The third capacitor C3 may be electrically coupled to a ground voltage VSS at one end, and to the second switch SW2 at the other end. The fourth capacitor C4 may be electrically coupled to the ground voltage VSS at one end, and to the second switch SW2 at the other end. The second switch SW2 may be electrically coupled to both of the third and fourth capacitors C3 and C4 at one end, and to the node N, where the reference voltage VREF is outputted, at the other end.

The first and second switches SW1 and SW2 may be turned on in response to the enablement signal EN. When the enablement signal EN is disabled, the first and second switches SW1 and SW2 may be turned off and electrically decouple the first to fourth capacitors C1, C2, C3 and C4 from the node where the reference voltage VREF is outputted. When the enablement signal EN is enabled, the first and second switches SW1 and SW2 may be turned on and electrically couple the first to fourth capacitors C1, C2, C3 and C4 to the node where the reference voltage VREF is outputted. The first to fourth capacitors C1, C2, C3 and C4 may be charged by the node N, and may allow the reference voltage VREF to stably stay at the target level even though voltage level variation of the node N.

Figure 6A:
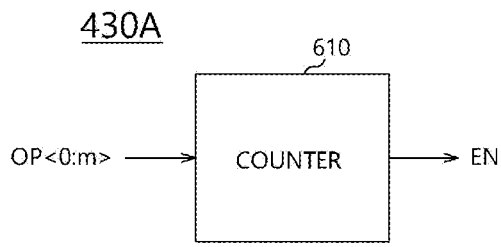
FIGS. 6A and 6B are block diagrams illustrating a representation of an example of a level stabilization controller in accordance with an embodiment.
Figure 6B:
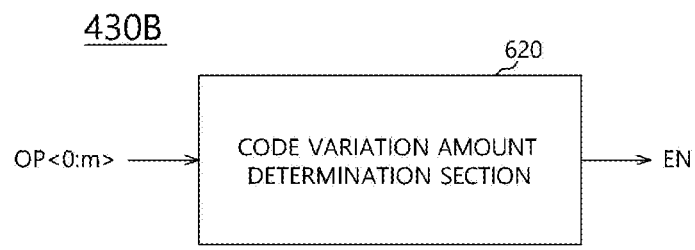

FIGS. 6A and 6B are block diagrams illustrating representations of examples of a level stabilization controller 430A and 430B in accordance with an embodiment of the present disclosure. Referring to FIG. 6A, the level stabilization controller 430A may include a counter 610. The counter 610 may generate the enablement signal EN by receiving the voltage set code OP<0:m>. The counter 610 may disable the enablement signal EN when the value of the voltage set code OP<0:m> changes. The level stabilization controller 430A may enable the enablement signal EN a predetermined time after the enablement signal EN is disabled. The level stabilization controller 430A may enable the enablement signal EN the predetermined time after the enablement signal EN is disabled through the counting operation. The predetermined time may be arbitrarily set or may be a settling time for the reference voltage VREF to reach the target level according to the voltage set code OP<0:m>.

Referring to FIG. 6B, the level stabilization controller 430B may include a code variation amount determination section 620. The level stabilization controller 430B may generate the enablement signal EN according to the amount of variation in the level of the reference voltage VREF. For example, when the level difference between the reference voltage VREF and the target level is great, the level stabilization controller 430B may disable the enablement signal EN and then enable the enablement signal EN the predetermined time after the enablement signal EN is disabled. On the other hand, when the level difference between the reference voltage VREF and the target level is small, the level stabilization controller 430B may keep the enablement signal EN enabled without disabling the enablement signal EN.

For example, the code variation amount determination section 620 may compare the previously set voltage set code OP<0:m> and the currently set voltage set code OP<0:m>. The code variation amount determination section 620 may disable the enablement signal EN when the amount of variation is great in the difference between the previously set voltage set code OP<0:m> and the currently set voltage set code OP<0:m>, and may keep the enablement signal EN enabled when the amount of variation is small in the difference between the previously set voltage set code OP<0:m> and the currently set voltage set code OP<0:m>. For example, the code variation amount determination section 620 may determine that the amount of variation is great in the difference between the previously set voltage set code OP<0:m> and the currently set voltage set code OP<0:m> and may disable the enablement signal EN when a higher bit of the voltage set code OP<0:m> changes. On the other hand, the code variation amount determination section 620 may determine that the amount of variation is small in the difference between the previously set voltage set code OP<0:m> and the currently set voltage set code OP<0:m> and may keep the enablement signal EN enabled when a lower bit of the voltage set code OP<0:m> changes or when the voltage set code OP<0:m> does not change.

Figure 7:
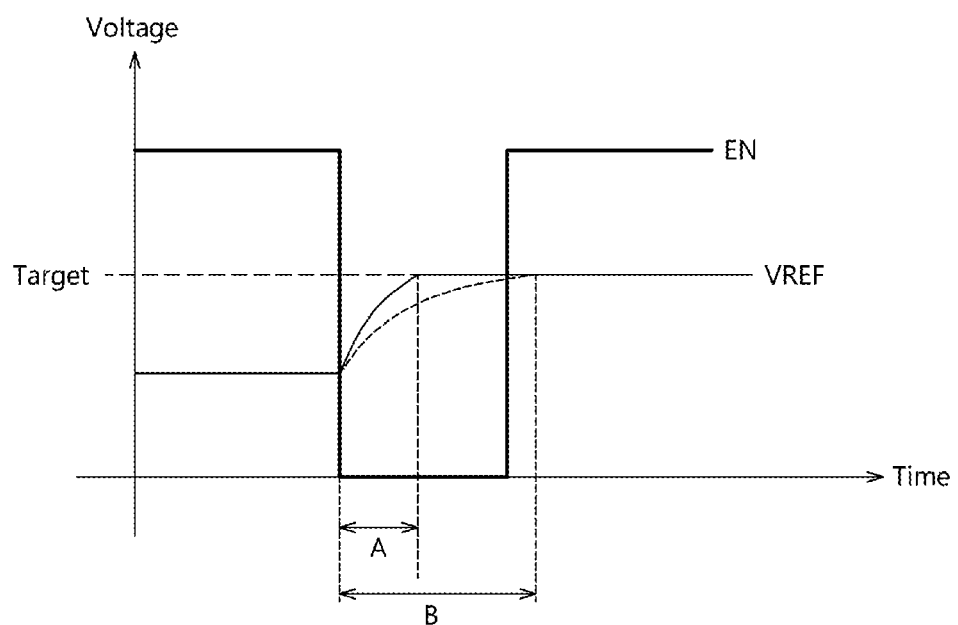
FIG. 7 is a timing diagram illustrating a representation of an example of an operation of a reference voltage generation circuit in accordance with an embodiment.

FIG. 7 is a timing diagram illustrating a representation of an example of an operation of the reference voltage generation circuit 320 and 400 in accordance with an embodiment of the present disclosure. Referring to FIGS. 2 to 7, operation of the reference voltage generation circuit 400 and the receiver 30 is as follows. The enablement signal EN may be stay enabled by default. The voltage set code OP<0:m> may be input to the internal reference voltage generator 410 when the memory 220 transitions from the stand-by mode to the active mode and receives the data DQ from the memory controller 210. The internal reference voltage generator 410 may increase the reference voltage VREF to the target level according to the voltage set code OP<0:m>. At this time, the level stabilization controller 430 may detect a value change of the voltage set code OP<0:m> and disable the enablement signal EN. The level stabilization controller 430 may be deactivated in response to the disabled enablement signal EN. That is, the first and second switches SW1 and SW2 may be turned off and the first to fourth capacitors C1, C2, C3 and C4 may be electrically decoupled from the node N. Therefore, the loading of the node N may decrease and the level of the reference voltage VREF output from the node N may rapidly increase.

As an example in FIG. 7, the settling time A of the reference voltage VREF when the first to fourth capacitors C1, C2, C3 and C4 are electrically decoupled from the node N may be much shorter than the settling time B of the reference voltage VREF when the first to fourth capacitors C1, C2, C3 and C4 stay electrically coupled to the node N. As such, the level stabilization controller 430 may allow the reference voltage VREF to rapidly reach to the target level by disabling the voltage level stabilizer 420. The predetermined time after the enablement signal EN is disabled, the level stabilization controller 430 may enable the enablement signal EN again. When the enablement signal EN is enabled, the first and second switches SW1 and SW2 may be turned on and the first to fourth capacitors C1, C2, C3 and C4 may be electrically coupled to the node N. Therefore, the reference voltage VREF of the target level may stably stay at the target level. As the reference voltage VREF rapidly reaches the target level, the reception circuit 310 may be completely ready to receive the data DQ right after the reference voltage VREF reaches the target level. Therefore, the receiver 30 and the semiconductor apparatus may stably receive the data DQ.

Figure 8:
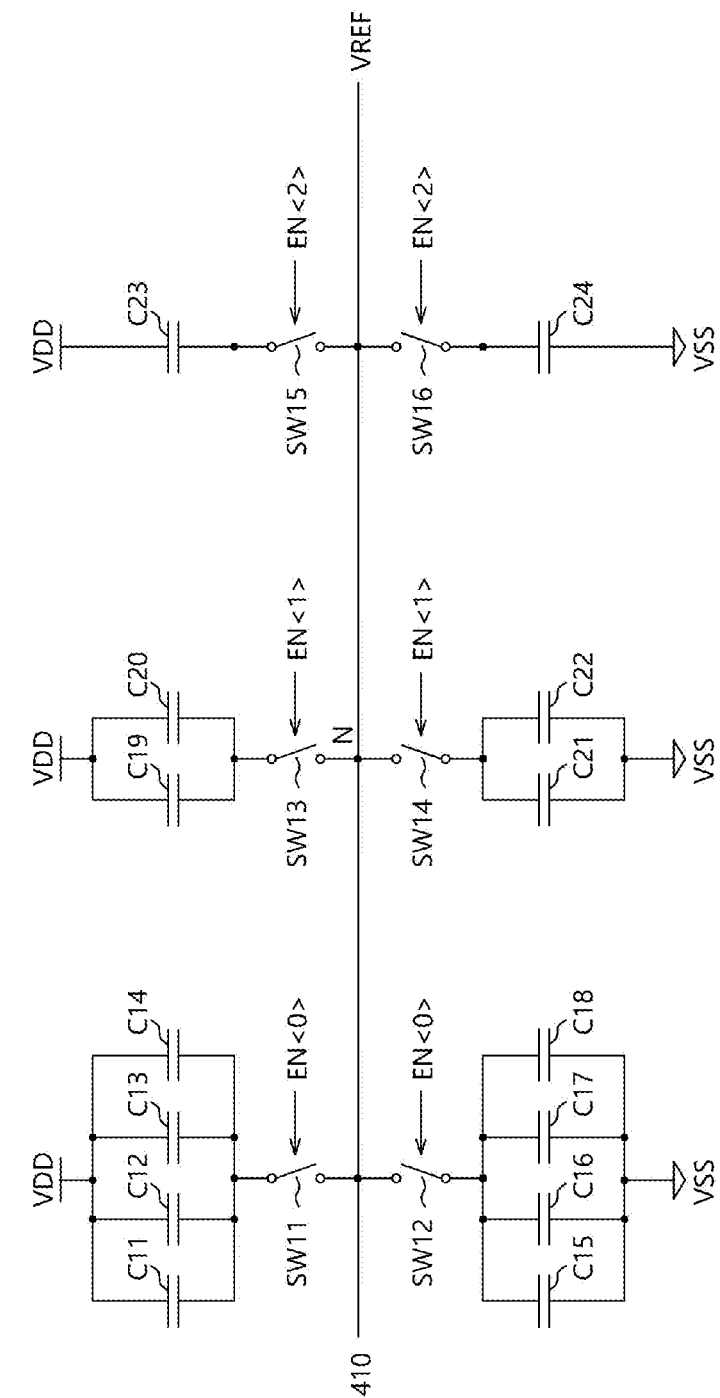
FIG. 8 is a block diagram illustrating a representation of an example of a voltage level stabilizer in accordance with an embodiment.

FIG. 8 is a block diagram illustrating a representation of an example of a voltage level stabilizer 420B in accordance with an embodiment of the present disclosure. Referring to FIG. 8, the voltage level stabilizer 420B may include first to fourteenth capacitors C11 to C24 and first to sixth switches SW11 to SW16. The first capacitor C11 may be electrically coupled to a power supply voltage VDD at one end, and to the first switch SW11 at the other end. The second capacitor C12 may be electrically coupled to the power supply voltage VDD at one end, and to the first switch SW11 at the other end. The third capacitor C13 may be electrically coupled to a power supply voltage VDD at one end, and to the first switch SW11 at the other end. The fourth capacitor C14 may be electrically coupled to the power supply voltage VDD at one end, and to the first switch SW11 at the other end. The first switch SW11 may be electrically coupled to all of the first to fourth capacitors C11 to C14 at one end, and to the node N, where the reference voltage VREF is outputted, at the other end. The fifth capacitor C15 may be electrically coupled to a ground voltage VSS at one end, and to the second switch SW12 at the other end. The sixth capacitor C16 may be electrically coupled to the ground voltage VSS at one end, and to the second switch SW12 at the other end. The seventh capacitor C17 may be electrically coupled to a ground voltage VSS at one end, and to the second switch SW12 at the other end. The eighth capacitor C18 may be electrically coupled to the ground voltage VSS at one end, and to the second switch SW12 at the other end. The second switch SW12 may be electrically coupled to all of the fifth to eighth capacitors C15 to C18 at one end, and to the node N, where the reference voltage VREF is outputted, at the other end. The first to eighth capacitors C11 to C18 may provide the greatest loading to the node N through the first and second switches SW11 and SW12.

The ninth capacitor C19 may be electrically coupled to the power supply voltage VDD at one end, and to the third switch SW13 at the other end. The tenth capacitor C20 may be electrically coupled to the power supply voltage VDD at one end, and to the third switch SW13 at the other end. The third switch SW13 may be electrically coupled to both of the ninth and tenth capacitors C19 and C20 at one end, and to the node N, where the reference voltage VREF is outputted, at the other end. The eleventh capacitor C21 may be electrically coupled to the ground voltage VSS at one end, and to the fourth switch SW14 at the other end. The twelfth capacitor C22 may be electrically coupled to the ground voltage VSS at one end, and to the fourth switch SW14 at the other end. The fourth switch SW14 may be electrically coupled to both of the eleventh and twelfth capacitors C19 and C22 at one end, and to the node N, where the reference voltage VREF is outputted, at the other end. The ninth to twelfth capacitors C19, C20, C21 and C22 may provide a half of the loading of the first to eighth capacitors C11 to C18 to the node N through the third and fourth switches SW13 and SW14.

The thirteenth capacitor C23 may be electrically coupled to the power supply voltage VDD at one end, and to the fifth switch SW15 at the other end. The fourteenth capacitor C24 may be electrically coupled to the ground voltage VSS at one end, and to the sixth switch SW16 at the other end. The thirteenth to fourteenth capacitors C23 and C24 may provide a half of the loading of the ninth to twelfth capacitors C19, C20, C21 and C22 to the node N through the fifth and sixth switches SW15 and SW16.

The enablement signal EN may include a plurality of enablement signals, and, as illustrated, for example, in FIG. 7, the enablement signal EN may include first to third enablement signals EN<0>, EN<1> and EN<2>. The first and second switches SW11 and SW12 may be turned on in response to the first enablement signal EN<0>, the third and fourth switches SW13 and SW14 may be turned on in response to the second enablement signal EN<1>, and the fifth and sixth switches SW15 and SW16 may be turned on in response to the third enablement signal EN<2>.

Figure 9:
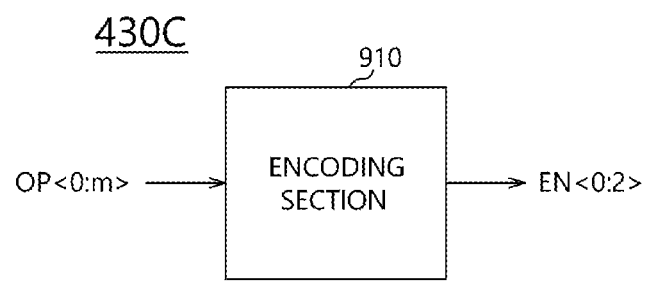
FIG. 9 is a block diagram illustrating a representation of an example of a level stabilization controller in accordance with an embodiment.

FIG. 9 is a block diagram illustrating a representation of an example of a level stabilization controller 430C in accordance with an embodiment of the present disclosure. Referring to FIG. 9, the level stabilization controller 430C may include an encoding section 910. The level stabilization controller 430C may be implemented by the encoding section 910 when the voltage level stabilizer 420B is configured as described with reference to FIG. 8. The encoding section 910 may generate the first to third enablement signals EN<0>, EN<1> and EN<2> by encoding the voltage set code OP<0:m>. The encoding section 910 may selectively enable one or more of the first to third enablement signals EN<0>, EN<1> and EN<2> according to the voltage set code OP<0:m>.

For example, when the value of the voltage set code OP<0:m> is great, the encoding section 910 may disable the first and second enablement signals EN<0> and EN<1> while keeping the third enablement signal EN<2> enabled. The predetermined time after the first and second enablement signals EN<0> and EN<1> are disabled, the encoding section 910 may enable the first and second enablement signals EN<0> and EN<1> again. For example, when the value of the voltage set code OP<0:m> is intermediate, the encoding section 910 may disable the first enablement signal EN<0> while keeping the second and third enablement signals EN<1> and EN<2> enabled. The predetermined time after the first enablement signal EN<0> is disabled, the encoding section 910 may enable the first enablement signal EN<0> again. For example, when the value of the voltage set code OP<0:m> is small, the encoding section 910 may disable the second enablement signal EN<1> while keeping the first and third enablement signals EN<0> and EN<2> enabled. The predetermined time after the second enablement signal EN<1> is disabled, the encoding section 910 may enable the second enablement signal EN<1> again.

The first to fourteenth capacitors C11 to C24 may be charged by the node N and thus may affect variation speed of the level of the reference voltage VREF during the charge thereof. The encoding section 910 may optimize time for the reference voltage VREF to reach the target level by selectively disabling the first to third enablement signals EN<0>, EN<1> and EN<2> and changing the number of capacitors electrically coupled to the node N according to the value of the voltage set code OP<0:m>. Schemes by which the encoding section 910 selectively enables the first to third enablement signals EN<0>, EN<1> and EN<2> according to the voltage set code OP<0:m> may vary.

While certain embodiments have been described above, it will be understood to those skilled in the art that the embodiments described are by way of example only. Accordingly, the reference voltage generation circuit, receiver, semiconductor apparatus and system using the same should not be limited based on the described embodiments. Rather, the reference voltage generation circuit, receiver, semiconductor apparatus and system using the same described herein should only be limited in light of the claims that follow when taken in conjunction with the above description and accompanying drawings.

What is claimed is:

1. A reference voltage generation circuit comprising:
    an internal reference voltage generator configured to change a level of a reference voltage according to a voltage set code;
    a voltage level stabilizer configured to stabilize the reference voltage in response to an enablement signal; and
    a level stabilization controller configured to generate the enablement signal based on the voltage set code.

2. The reference voltage generation circuit of claim 1, wherein the voltage level stabilizer changes a capacitance of a node, where the reference voltage is outputted, in response to the enablement signal.

3. The reference voltage generation circuit of claim 1, wherein the level stabilization controller generates the enablement signal according to a value change of the voltage set code.

4. The reference voltage generation circuit of claim 3, wherein the level stabilization controller enables the enablement signal a predetermined time after the enablement signal is disabled.

5. The reference voltage generation circuit of claim 1, wherein the voltage level stabilizer includes a plurality of capacitors electrically coupled to a node, where the reference voltage is outputted, in response to the enablement signal.

6. The reference voltage generation circuit of claim 1,
    wherein the enablement signal includes a plurality of enablement signals, and
    wherein the voltage level stabilizer includes a plurality of capacitors electrically coupled to a node, where the reference voltage is outputted, in response to the plurality of enablement signals.

7. The reference voltage generation circuit of claim 6, wherein the level stabilization controller includes an encoding section configured to generate the plurality of enablement signals by encoding the voltage set code.

8. The reference voltage generation circuit of claim 1, wherein the voltage level stabilizer stabilizes the reference voltage by changing loading of a node where the reference voltage is outputted.

9. The reference voltage generation circuit of claim 1, wherein the level stabilization controller deactivates the voltage level stabilizer when the reference voltage changes, and activates the voltage level stabilizer after the reference voltage is at a target level.

10. A receiver comprising:
    a reception circuit configured to generate an internal signal by differentially amplifying a reference voltage and a signal transmitted through a signal transmission line; and
    a reference voltage generation circuit configured to adjust the reference voltage according to a voltage set code, and including a voltage level stabilizer configured to stabilize a level of the reference voltage,
    wherein the reference voltage generation unit is configured to generate the reference voltage according to the voltage set code, and deactivate the voltage level stabilizer when the level of the reference voltage changes and to activate the voltage level stabilizer when the reference voltage reaches a target level, based on the voltage set code.

11. The receiver of claim 10, wherein the reference voltage generation circuit further includes:
    an internal reference voltage generator configured to generate and change the level of the reference voltage according to the voltage set code; and
    a level stabilization controller configured to control the activation and deactivation of the voltage level stabilizer based on the voltage set code.

12. The receiver of claim 11,
wherein the level stabilization controller generates an enablement signal according to the voltage set code, and
wherein the voltage level stabilizer stabilizes the level of the reference voltage in response to the enablement signal.

13. The receiver of claim 12, wherein the level stabilization controller disables the enablement signal according to a value of the voltage set code.

14. The receiver of claim 13, wherein the level stabilization controller enables the enablement signal a predetermined time after the enablement signal is disabled.

15. The receiver of claim 13, wherein the voltage level stabilizer includes a plurality of capacitors electrically coupled to a node, where the reference voltage is outputted, in response to the enablement signal.

16. The receiver of claim 13,
wherein the enablement signal includes a plurality of enablement signals, and
wherein the voltage level stabilizer includes a plurality of capacitors electrically coupled to a node, where the reference voltage is outputted, in response to the plurality of enablement signals.

17. The receiver of claim 16, wherein the level stabilization controller includes an encoding section configured to generate the plurality of enablement signals by encoding the voltage set code.

18. The receiver of claim 10, wherein the voltage level stabilizer stabilizes the reference voltage by changing loading of a node where the reference voltage is outputted.

19. A receiver comprising:
a reception circuit configured to generate an internal signal by differentially amplifying a reference voltage and a signal transmitted through a signal transmission line; and
a reference voltage generation circuit configured to generate the reference voltage, and stabilize a level of the reference voltage after the reference voltage reaches a target level, based on a voltage set code.

20. The receiver of claim 19, wherein the reference voltage generation circuit includes:
a voltage level stabilizer configured to stabilize the level of the reference voltage when the reference voltage reaches the target level and wherein the voltage level stabilizer is deactivated when the level of the reference voltage changes based on the voltage set code.

* * * * *